United States Patent Office 3,114,691
Patented Dec. 17, 1963

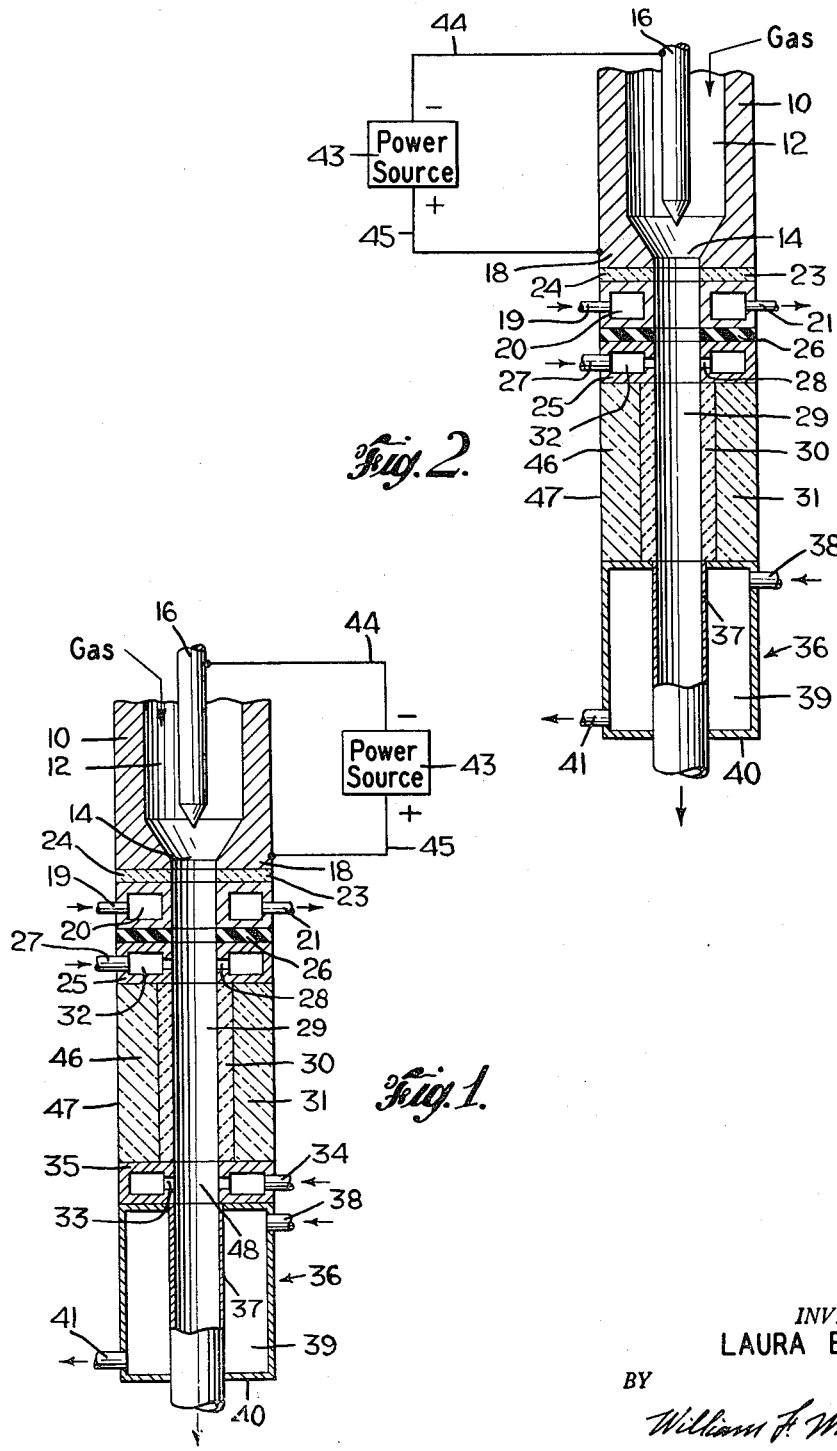

3,114,691
ARC PROMOTED CHEMICAL REACTIONS
Laura E. Case, Lafayette, Ind., assignor to Union Carbide
Corporation, a corporation of New York
Filed June 20, 1960, Ser. No. 37,197
18 Claims. (Cl. 204—171)

This invention relates to chemical reactions promoted by the thermal energy of an electric arc and, more particularly, to a method of concurrently forming acetylene and hydrogen cyanide by imparting, in controlled amounts, the thermal energy of an arc gas effluent from a collimated arc to a hydrocarbon, such as methane, in the presence of nitrogen or a dissociable nitrogen-containing compound, such as ammonia.

Electric arcs have previously been used as heat sources to promote various chemical reactions. Acetylene, for example, has previously been prepared by passing a hydrocarbon through an arc, contacting a hydrocarbon with an arc gas effluent, or striking an arc in a liquid hydrocarbon. Hydrogen cyanide, on the other hand, has been prepared by striking an arc in a liquid or gaseous hydrocarbon and passing nitrogen gas into the arc zone. These and other similar prior art processes never became commercially practical because the yields of desired products were unsatisfactory and also because of lack of complete control over the amount of heat energy available for reaction promotion.

A major advance over the prior art was made when the arc gas effluent from a collimated arc was used as the heat source for chemical reaction promotion. This is described in detail in copending application Serial No. 763,418, filed September 25, 1958, now U.S. Patent 3,051,639. In such process, a gas stream passes through a collimated arc of the type described in U.S. Patents 2,806,124 and 2,858,411, is heated to a temperature approaching that of the arc itself, and then exits from the arc zone as a relatively stable column of hot gas. The control over heat content and position of the arc gas effluent obtainable in such process enables greater control to be obtained over the subsequent chemical reaction.

Up until the present time, in order to produce a desired mixture of acetylene and hydrogen cyanide it was generally necessary to first separately produce the acetylene and hydrogen cyanide and then mix the two separate ingredients to form the mixture having the desired proportions of acetylene and hydrogen cyanide. For example, the feed stock utilized in the production of acrylonitrile desirably contains about a one to one mole ratio of acetylene to hydrogen cyanide. Such stock heretofore had to be made by mixing acetylene with hydrogen cyanide. It should be noted that while the desired feed stock has a one to one ratio, the acrylonitrile reaction zone mixture is about five moles of acetylene to one mole of hydrogen cyanide. The four moles of excess acetylene are present only to reduce side reactions and are continuously recycled.

Accordingly, it is an object of this invention to provide an improved electric arc process for chemical reaction promotion wherein acetylene and hydrogen cyanide are concurrently formed as a reaction product.

Another object is to provide an electric arc process for concurrently producing acetylene and hydrogen cyanide wherein the heat energy level of an arc-heated gas stream is controlled such that at least about 20 and not over about 170 kilocalories per gram moles of carbon in the total hydrocarbon supplied are provided to the reactant materials.

Still another object is to provide a process for making acetylene and hydrogen cyanide wherein hydrocarbons such as methane, ethane and propane are converted in the presence of nitrogen or a dissociable nitrogen-containing compound, such as ammonia.

A further object is to provide simple compact apparatus for the production of acetylene and hydrogen cyanide.

Other objects and advantages will be pointed out or become apparent from the following description and drawings found herein.

According to the present invention acetylene and hydrogen cyanide are concurrently produced in a reaction product by energizing a high-pressure arc of predetermined arc intensity, and then flowing an arc gas at a controllable rate through the arc to form a resulting stream of hot arc gas having a variable thermal energy level which can be determined by adjusting the arc intensity and/or the flow rate of the arc gas. Reactant material is then fed at a controllable rate to a reaction zone where the thermal energy in such gas stream is imparted to such reactant material.

The thermal energy level in the hot arc gas is selected and the feed rate of the reactant material is adjusted to such that at least about 20 and not over about 170 kilocalories/gram moles of carbon in the hydrocarbon are provided to the total reactant material. Finally the reaction products containing acetylene and hydrogen cyanide are cooled and quenched.

In practicing the invention an arc gas such as argon, hydrogen, nitrogen or mixtures thereof may be used. However, in the preferred form of the invention, nitrogen gas is used since it is a reactant necessary for production of hydrogen cyanide, and its electrical properties also allow it to be conveniently used as an arc gas for supplying heat for chemical reaction promotion. Also, the reactant, combined with the hot arc gas effluent, may be a paraffinic hydrocarbon such as methane, ethane, or propane or mixtures of such hydrocarbon with hydrogen or with nitrogen or a dissociable nitrogen-bearing compound or mixtures of such hydrocarbon with a nitrogen or dissociable nitrogen-bearing compound and hydrogen. It is to be understood that aromatic hydrocarbons such as benzene, toluene and xylene can be used as the hydrocarbon if the economics of the specific process location allow such use.

In the preferred form of the invention methane is the reactant used and the preferred energy input to the methane is in the range of from about 90 to about 120 kilocalories/gram mole of carbon in the total methane supplied. Although various combinations of arc gases and reactants can be used in the invention, it is to be understood that any combination selected must have nitrogen present.

In the broadest form of the present invention the energy input to the hydrocarbon should be at least 20 kilocalories/gram mole of carbon in the hydrocarbon supplied and is conveniently not over about 170 kilocalories/gram mole of carbon. This is the ratio between the heat content of the arc gas stream to the total feed stock in the reaction zone. The particular energy input used will be determined by two factors: the hydrocarbon being used and the desired ratio between hydrogen cyanide and acetylene in the reaction products. It has been found that when the preferred feed stock methane is used, the energy input should be at least 60 kilocalories/gram mole of carbon in order to get satisfactory yields of both acetylene and hydrogen cyanide. As the energy level is increased, the yield of hydrogen cyanide increases but the acetylene formed begins to decompose to carbon. The ratio between acetylene and hydrogen cyanide in the product mixture thus decreases with increased energy level and can thus be controlled. At energy levels above about 170 kilocalories/gram mole of carbon, the carbon formation with methane is prohibitive. If other hydrocarbons are used which are more readily thermally cracked, the energy level at which satisfactory yields of desired reaction products are obtained decreases. Thus with ethane, energy inputs as low as 40 kilocalories/gram mole of carbon could be used, and with propane, energy levels of 20 kilocalories/gram mole of carbon may be satisfactory. As the number of carbon atoms in the hydrocarbon feed stock molecule increases, the upper limit for energy level also decreases since these materials more readily decompose to carbon and other undesirable products. The preferred energy input for presently desired mixtures of hydrogen cyanide and acetylene is about 90–120 kilocalories/gram mole of carbon when methane is used as the feed stock.

The method of the invention has several advantages. One advantage is that a product suitable for further chemical processing is formed in a single operation. Other advantages are that varying proportions of acetylene to hydrogen cyanide in the final product may be obtained by changing the heat energy input to the reactant and that unusually high yields of product are obtained with low energy consumption.

The invention will be described in more detail in referring to the drawings in which:

FIG. 1 is a sectional view of the preferred apparatus for carrying out the invention; and FIG. 2 is a sectional view of another form of apparatus for carrying out the invention.

Referring to FIG. 1, 10 is a cylindrical copper body member which contains a cylindrical bore 12. The bore 12 tapers to a cylindrical nozzle passage 14 in the anode section 18 of body 10. A cathode 16 is axially aligned within bore 12 and is spaced from the walls of body member 10. Cathode 16 is preferably in the form of a rod or pencil and is conveniently constructed of thoriated tungsten. Anode 18 and body member 10 may conveniently be made of copper.

In order to prevent melting due to arc heat, the torch body 10 and anode section 18 are cooled by passing water or other cooling fluid from inlet 19 through annular cooling passage 20 and out through outlet 21. Even under these conditions the anode 18 is subject to severe arc erosion and pitting. It has been found that anode erosion can be practically eliminated by incorporating preferential electrode inserts in the anode nozzle wall. The preferential electrode is shown with inserts 23 and 24, each of which is in the shape of a small rod. These inserts could be of any desired shape as long as a surface is exposed to the nozzle passage. The preferential electrode may be of tungsten, tantalum or other material resistant to erosion by the high intensity electric arc. It is important that the insert be mounted so as to be partially thermally insulated from the adjacent cool anode material in order that the insert will operate at a higher temperature than the adjacent anode material. The exposed insert surface inside the nozzle passage thereby operates "hot" and the arc thus tends to strike the hot insert rather than the adjacent cool copper anode. This poor heat exchange relationship is conveniently obtained by loosely fitting the insert in the anode wall and making electrical connection by soldering only at the outer surface. The use of these tungsten inserts is especially effective in reducing anode erosion when an active diatomic gas, such as hydrogen or nitrogen is used as the arc gas. This torch modification using preferential electrode inserts is disclosed in copending application Ser. No. 763,419, now U.S. Patent 2,951,143.

A feed stock inlet means 25 is positioned substantially adjacent to nozzle anode 18 and is separated therefrom by electrical insulator 26. Feed stock inlet means 25 has an inlet conduit 27 and inlet passage 32 through which desired hydrocarbon feed stock passes for contact with the arc gas effluent from nozzle passage 14.

A first reaction zone 29 wherein substantially complete mixing takes place between the injected feed stock and the arc gas effluent can be contained within any suitable surrounding means that can stand up to the operating temperatures. A water-cooled copper tube could be used, but the heat loss through the cooled walls is highly undesirable. It is preferred that a refractory liner 30 be used surrounding the reaction zone 29. Such liner can be fabricated, for example, from carbon, zirconia or tungsten. It is further desired that the liner 30 be surrounded by an additional insulating layer 31 conveniently of thermatomic carbon. This reactor combination reduces heat loss from the reaction zone and maintains a high thermal efficiency for the process. In the apparatus shown in FIG. 1, the reaction zone is contained in a longitudinal member 46 having a centrally located passage forming reaction zone 29 therethrough, a refractory liner 30 forming the walls of said passage and an insulating layer 31 between said liner 30 and the outside wall 47 of said longitudinal member 46.

A second feed inlet means 35 similar to 25 is preferably positioned adjacent first reaction zone 29 and is axially aligned therewith. A quench zone member 36 is positioned downstream with respect to the second feed inlet means 35 and comprises a quenching surface 37 which is cooled by passing cooling fluid such as water from inlet 38 through the annular space 39 between quench surface 37 and outer wall 40 then out through outlet 41.

Cathode 16 and anode 18 are connected to a suitable source of electric power 43 by leads 44 and 45 for energizing a high-pressure arc across such electrodes. Typical arc circuits are shown in U.S. Patent 2,858,411, issued October 28, 1958. An arc gas such as hydrogen, argon, nitrogen or other suitable gas or gas mixture, but preferably nitrogen, is introduced through inlet means (not shown) into the annular space between bore 12 and cathode 16. The gas flows around cathode 16 and into nozzle passage 14. The arc between the electrodes is forced into the nozzle 14 by the flow of such gas, and the arc and gas are thereby stabilized and collimated by the walls of the nozzle and laterally constrained to conform to the dimensions of the nozzle. The arc gas is heated by the arc in the nozzle 14, is collimated to conform to the cross-sectional shape of the nozzle and is discharged as a hot, high-velocity gas stream.

The fluid hydrocarbon stock, preferably methane, to be treated enters feed inlet means 25 through hydrocarbon inlet conduit 27 and is injected through the openings 28 into the hot, high-velocity gas stream discharged from nozzle 14.

Then the combined gas stream containing hot arc gas effluent and reactant material passes into a reaction chamber 29 wherein complete mixing occurs. The feed stock introduced at this first injection point located near the nozzle outlet and mixed with the hot gas effluent in chamber 29 is thought to be converted primarily to hydrogen cyanide, since as mentioned above it has been found that as thermal energy input to the stock increases, the production of hydrogen cyanide increases. The proper heat energy input for desired reaction conditions can be conveniently obtained by varying the power input to the gas, varying the rate of stock injected or by a combination of these.

More reactant is then added through a second annular member 35 through inlet conduit 34 and is injected through openings 33 into the hot gas effluent which is now at a lower heat energy level and reacts therewith in second reaction zone 48. It is thought that the reactant added here, because of the lower energy level, is converted almost instantaneously and primarily to acetylene with minimum carbon formation. The reactant added at the second injection point may be the same as the reactant added upstream or it may be a different reactant. For example, if methane is added upstream, ethane may be added at the second point. However, in the preferred method, methane is added at both points.

As described in pending application Serial No. 763,418, introduction of hydrogen into the hot reaction gases prior to their being completely quenched tends to reduce formation of carbon and thus increase the yield of acetylene. This process variation has also been found to be useful with the present process wherein the acetylene yield is increased without affecting hydrogen cyanide production. Such hydrogen gas can be introduced either through the downstream feed inlet 34 or through a subsequent downstream inlet.

The hot reaction gasses then pass to quench zone member 36 wherein they are cooled to a temperature at which that is substantially no decomposition of acetylene and hydrogen cyanide. Various quench means can be used, such as heat exchange with a liquid spray or with a gas stream. In order to prevent diluting the reaction product gases with quench material, it is preferable that a cold surface be used to quench the reaction gases. The product collected is then ready for further processing.

FIG. 2 shows an apparatus modification which is suitable for carrying out the invention. In this apparatus modification, which is essentially the same as FIG. 1 and therefore like parts bear the same reference numbers, all the reactant material is added to the hot gas effluent through feed inlet means 25 positioned substantially adjacent to nozzle anode 18. In this case there is no second injection point but all other parts are the same.

The following examples describe the present invention in actual practice.

*Example I*

The torch apparatus was substantially as shown in FIG. 2 except that a water-cooled reaction zone was used. An arc was maintained between a 3/16 inch diameter thoriated tungsten stick cathode and a water-cooled copper nozzle anode having a 3/16 inch diameter anode passage. Two tungsten preferential electrode inserts 1/8 inch in diameter were positioned in the walls of the nozzle anode passage. Nitrogen gas at 78.5 gram moles/hr. (29.3 liters/min.) passed through the torch and recevied 9.16 kw. of the arc thermal energy. A methane stream of 113 gram moles/hr. (42.2 liters/min.) contacted and mixed with the hot nitrogen stream in a 3/4 inch I.D. water-cooled copper reaction zone 3/4 inch long. The energy input to the feed stock was calculated to be 69.8 kilocalories/gram mole of carbon. The reaction product gases than passed into a 1/2 inch I.D. water-cooled copper quench tube 18 inches long. The outlet gases were then conducted to sampling means and vent lines through a 3/4 inch I.D. water-cooled copper conduit 6 1/2 feet long. About 60 to 80% of the quenching took place within the 18 inch long quench means while the remainder of the quenching took place in the subsequent conduit. The product gases contained 9.2 vol. percent acetylene and 2.1 vol. percent hydrogen cyanide for a calculated conversion of 68.9% of the carbon in the methane to carbon in acetylene plus hydrogen cyanide.

*Example II*

The torch apparatus and quenching apparatus were the same as described in Example I. The water-cooled copper reaction zone member was replaced with a 3/4 inch I.D., 1 inch O.D. carbon tube 2 1/2 inches long surrounded by a 5/8 inch thick layer of thermatomic carbon insulation. A nitrogen gas flow of 80.5 gram moles/hr. (30.1 liters/min.) containing 0.64 kw. of thermal energy contacted a methane stream of 102.5 gram moles/hr. (38.3 liters/min.) at the inlet region of the reaction zone to provide an energy input to the feed stock of 80.9 kilocalories/gram moles of carbon. The quenching product gases contained 12.4 vol. percent acetylene and 3.2 vol. percent hydrogen cyanide. Calculations indicated that 85.9% of the methane reacted and 84.9% of the reacted methane was converted to acetylene plus hydrogen cyanide.

The following examples describe operation using gases other than nitrogen alone in the arc gas stream.

*Example III*

The apparatus used was the same as described in Example II. A mixture of 83 gram moles/hr. (31 liters/min.) nitrogen and 37 gram moles/hr. (13.8 liters/min.) hydrogen containing 14.66 kw. of thermal energy contacted a methane stream of 143 gram moles/hr. (53.3 liters/min.) to provide an energy input to the feed stock of 88.2 kilocalories/gram mole of carbon. The quenched product gases contained 13.1 vol. percent acetylene and 1.8 vol. percent hydrogen cyanide. Calculations indicated that 94% of the methane reacted and 81.4% of the reacted methane was converted to acetylene plus hydrogen cyanide.

*Example IV*

The apparatus used was the same as described in Example II. A hydrogen gas flow of 80.4 gram moles/hr. (30 liters/min.) containing 8.21 kw. of thermal energy contacted a feed stock mixture containing 72.5 gram moles/hr. (27.1 liters/min.) methane and 32 gram moles/hr. (11.9 liters/min.) nitrogen to provide an energy input to the feed stock of 97.5 kilocalories/gram mole of carbon. The quenched product gases contained 9.7 vol. percent acetylene and 0.5 vol. percent hydrogen cyanide. Calculations indicated that 85.1% of the methane reacted and 80.9% of the reacted methane was converted to acetylene plus hydrogen cyanide.

*Example V*

The apparatus used was the same as described in Example II. An argon gas flow of 49 gram moles/hr. (18.3 liters/min.) containing 3.02 kw. of thermal energy contacted a feed stock stream containing 36.8 gram moles/hr. (13.7 liters/min.) methane and 63.5 gram moles/hr. (23.7 liters/min.) nitrogen to provide an energy input to the feed stock of 70.6 kilocalories/gram mole of carbon. The quenched product gases contained 3.1 vol. percent acetylene and 0.4 vol. percent hydrogen cyanide. Calculations indicated that 50.7% of the methane was reacted and that 60% of the reacted methane was converted to acetylene plus hydrogen cyanide.

It has been found that the addition of hydrogen in the feed stock stream can increase the overall conversion of hydrocarbon to acetylene plus hydrogen cyanide especially at high energy input values. This is shown by the following example.

*Example VI*

The apparatus used was the same as described in Example II. Nitrogen gas stream of 103.5 gram moles/hr. (38.6 liters/min.) containing 13.08 kw. of thermal energy contacted a feed stock stream of 74.0 gram moles/hr. (27.6 liters/min.) methane and 48.4 gram moles/hr. (18.1 liters/min.) hydrogen to provide an energy input to the feed stock of 152.1 kilocalories/gram mole of carbon. The quenched product gases contained 8.2 vol. percent acetylene and 3.1 vol. percent hydrogen cyanide. Calculations indicated that 99.6% of the methane was reacted and 79% of the reacted methane was converted to acetylene plus hydrogen cyanide. Runs made at comparable energy input values without the presence of hydrogen had only about 64% of the reacted methane converted to desired products. The remainder of the reacted methane was converted to undersirable products such as carbon.

Hydrocarbons other than methane can also be used in the present process. The following example describes operation using ethane as the feed stock.

*Example VII*

The apparatus used was the same as described in Example II. A nitrogen gas stream of 80.5 gram moles/hr. (30.1 liters/min.) containing 11.47 kw. of thermal energy contacted an ethane stream of 73.5 gram moles/hr. (27.4 liters/min.) to provide an energy input to the feed stock of 67.1 kilocalories/gram mole of carbon. The quenched product gases contained 10.8 vol. percent acetylene and 3.6 vol. percent hydrogen cyanide. Calculations indicated that 100% of the ethane was reacted and 51.1% of the reacted ethane was converted to acetylene plus hydrogen cyanide.

Nitrogen required for the production of hydrogen cyanide can also be obtained from dissociable nitrogen-containing compounds. The following example describes the use of ammonia.

*Example VIII*

The same apparatus as described in Example II was used for this run. A nitrogen stream of 110.5 gram moles/hr. (41.3 liters/min.) containing 13.37 kw. of thermal energy contacted a feed stock mixture of 145 gram moles/hr. (54.1 liters/min.) methane and 19.6 gram moles/hr. (7.3 liters/min.) ammonia to provide an energy input to the feed stock of 79.4 kilocalories/gram mole of carbon. The quenched product gas contained 9.8 vol. percent acetylene and 4.7 vol. percent hydrogen cyanide. If methane alone were contacted with nitrogen at approximately the same energy input, the hydrogen cyanide content of the product gas would only be about 3 vol. percent while the acetylene content would be about the same.

As mentioned above, it has been found that as the thermal energy input to the feed stock increases, the production of hydrogen cyanide increases, but that the decomposition of acetylene to carbon also increases. The preferred operation of the present invention therefore is to introduce the feed stock to the arc gas stream in at least two locations along the hot effluent path. The feed stock introduced in the first injection point located near the nozzle outlet from the torch is thought to be converted primarily to hydrogen cyanide. The feed stock introduced downstream of this point will contact the torch effluent at a lower thermal energy level and is thought to produce primarily acetylene. The overall conversion of hydrocarbon feed stock to desired products remains about the same, but the specific conversion to hydrogen cyanide has generally about doubled for the same amount of energy input to the feed stock. The desired volume ratio of $C_2H_2$:HCN of 1:1 for acrylonitrile production can thus be obtained at a substantially lower energy input with this novel variation than would be necessary if all the feed stock were introduced at a single location.

The following example describes this preferred multiple feed inlet process.

*Example IX*

The apparatus used was substantially the same as that described in Example II except that a second feed stock inlet means was positioned about 2 inches downstream of the first inlet means as shown in FIG. 1. A nitrogen gas stream of 119.5 gram moles/hr. (44.6 liters/min.) containing 15.14 kw. of thermal energy contacted a first methane stream of 51.7 gram moles/hr. (19.3 liters/min.) and a second methane stream of 104.5 gram moles/hr. (39 liters/min.) to provide an overall energy input to the feed stock of 83.4 kilocalories/gram mole of carbon. The quenched product gas contained 7.8 vol. percent acetylene and 6.2 vol. percent hydrogen cyanide. Calculations indicated that 74.7% of the total methane reacted and that 75.3% of the reacted methane was converted to acetylene plus hydrogen cyanide. About 22.6% of the reacted methane was specifically converted to hydrogen cyanide. This is substantially greater than 8.3% conversion obtained at comparable energy input using a single feed location.

The location of the second feed inlet means has been varied from ¼ inch to 2 inches below the first inlet means. As the distance increased, the overall conversion to hydrogen cyanide increased. The optimum location for the present scale equipment has not yet been determined.

The following examples describe a process variation where hydrogen is introduced into the hot reaction gases prior to their being completely quenched.

*Example X*

Apparatus similar to that described in Example IX was used except that a second inlet means was located about ½ inch downstream of the first feed inlet means. A nitrogen gas stream of 132 gram moles/hr. (49.3 liters/min.) containing 14.13 kw. of thermal energy contacted a methane stream of 89 gram moles/hr. (33.2 liters/min.) to provide an energy input of 136.6 kilocalories/gram mole of carbon. The hot reaction gases then contacted the hydrogen stream of 56 gram moles/hr. (20.9 liters/min.). The quenched product gases contained 7.8 vol. percent acetylene and 4.2 vol. percent hydrogen cyanide. Calculations indicated that 63.9% of the reacted methane formed acetylene. This is a substantial improvement over the acetylene conversion of only 43% obtained at comparable energy input without hydrogen partial quench.

*Example XI*

The apparatus used was substantially the same as that described in Example IX. An additional inlet means for hydrogen quench gas was positioned about 1 inch downstream of the second feed inlet. Nitrogen at 99.3 gram moles/hr. (37.1 liters/min.) containing 13.14 kw of thermal energy contacted first methane stream of 56.2 gram moles/hr. (21 liters/min.) and a second ethane stream of 58.2 gram moles/hr. (21.7 liters/min.) to provide an overall energy input to the feed stock of 65.5 kilocalories/gram mole of carbon. The hot reaction gases were then contacted with a hydrogen stream of 59.4 gram moles/hr. (22.2 liters/min.) the quenched product gases contained 9.4 vol. percent acetylene and 3.6 vol. percent hydrogen cyanide. Calculations indicated that about 89% of the feed stock reacted and that 60.9% of the reacted feed stock was converted to acetylene and hydrogen cyanide.

All the above examples employed direct current straight polarity power. It should be understood that while this type of electrical power is preferred, direct current, reverse polarity and alternating current are also useful.

It is to be understood that modifications may be made to the specific embodiments of the invention disclosed herein without departing from the spirit and scope thereof and that such disclosure merely describes the preferred forms of the invention without limiting the inventive concept herein disclosed. For example, while the above disclosure has been limited primarily to the preferred use of collimated arc apparatus for providing the high thermal content gas effluent for chemical reaction promotion, other arc devices can be employed as long as the thermal content requirements of the hot gas effluent are met.

What is claimed is:

1. Process for promoting chemical reactions which comprises energizing a high-pressure arc of predetermined arc intensity, flowing an arc gas at a controllable rate through said high-pressure arc, collimating and stabilizing such arc and gas stream by surrounding such stream with a cool surface, discharging the resultant collimated hot arc gas stream at a preselected thermal energy level into a first reaction zone, such thermal energy level being determined by said arc intensity and said controllable rate of arc gas flow, controllably feeding reactant material to said first reaction zone, intimately mixing said hot arc gas stream with said reactant material to impart some of said thermal energy in such gas stream to said reactant material, passing the reactant material-containing hot arc gas from said first reaction zone to a second reaction zone spaced from said first reaction zone, controllably feeding additional reactant material into said second reaction zone to react with said arc gas stream at a lower thermal energy level, correlating the total feed of said reactant materials with the arc intensity and rate of arc gas flow, and then cooling and quenching the reaction products.

2. Process for promoting chemical reactions which comprises energizing a high-pressure arc of predetermined arc intensity, flowing an arc gas at a controllable rate through said high-pressure arc, discharging the resultant hot arc gas stream at a preselected thermal energy level into a first reaction zone, such thermal energy level being determined by said arc intensity and said controllable rate of arc gas flow, controllably feeding reactant material to said first reaction zone, intimately mixing said hot arc gas stream with said reactant material to impart some of said thermal energy in such gas stream to said reactant material, passing the reactant material-hot arc gas mixture from said first reaction zone to a second reaction zone spaced from said first reaction zone, controllably feeding additional reactant material into said second reaction zone to react with said arc gas stream at a lower thermal energy level, correlating the total feed of said reactant materials, the arc intensity, and the rate of arc gas flow, and then cooling and quenching the reaction products.

3. Process for the concurrent production of acetylene and hydrogen cyanide which comprises energizing a high-pressure arc of predetermined arc intensity, flowing at least one arc gas taken from the class consisting of nitrogen, hydrogen, and argon at a controllable rate through said high-pressure arc, collimating and stabilizing such arc and gas stream by surrounding such stream with a cool surface, discharging the resulting collimated hot arc gas stream at a preselected thermal energy level into a first reaction zone, such thermal energy level being determined by said arc intensity and said controllable rate of arc gas flow, controllably feeding to said first reaction zone a reactant material taken from the class consisting of hydrocarbons and mixtures of such hydrocarbons with at least one material taken from the class consisting of nitrogen, hydrogen, and nitrogen-bearing compounds with the proviso that nitrogen be present either in said arc gas or the reactant material selected, intimately mixing said hot arc gas stream with said reactant material to impart some of said thermal energy in such gas stream to said reactant material, passing such reactant material-containing hot arc gas stream from said first reaction zone to a second reaction zone spaced from said first reaction zone, controllably feeding more reactant material into said second reaction zone to react with said arc gas stream at a lower thermal energy level to produce a product containing acetylene and hydrogen cyanide in desired proportions, correlating the total feed of said reactant materials with the arc intensity and the rate of arc gas flow, and then cooling and quenching the reaction products.

4. Process for the concurrent production of acetylene and hydrogen cyanide which comprises energizing a high-pressure arc of predetermined arc intensity, flowing at least one arc gas taken from the class consisting of nitrogen, hydrogen and argon at a controllable rate through said high-pressure arc, collimating and stabilizing such arc and gas stream by surrounding such stream with a cool surface, discharging the resultant collimated hot arc gas stream at a preselected first thermal energy level into a first reaction zone, controllably feeding to said first reaction zone reactant material taken from the class consisting of hydrocarbons and mixtures of such hydrocarbons with at least one material taken from the class consisting of nitrogen, hydrogen, and dissociable nitrogen-bearing compounds with the proviso that nitrogen be present either in said arc gas or in the reactant material selected, intimately mixing said hot arc gas stream at said first thermal energy level with said reactant material to preferentially form hydrogen cyanide in a reaction product, passing such reaction product-containing arc gas stream at a second lower energy level into a second reaction zone spaced from said first reaction zone, feeding additional reactant material into said second reaction zone, mixing such additional reactant material with said reaction product-containing hot arc gas stream at said second energy level to preferentially form acetylene in said reaction product, correlating the feed of the total reactant material with the arc intensity and the rate of arc gas flow to provide at least about 20 and not over about 170 kilocalories/gram mole of carbon in said hydrocarbon, and then cooling and quenching said reaction product, the result of so controlling the thermal energy input to said total reactant material being to determine the proportions of acetylene and hydrogen cyanide formed in said reaction product.

5. Process according to claim 4 wherein said hydrocarbon is methane and the arc intensity, arc gas flow rate, and total feed of reactant material are so correlated to provide at least about 60 kilocalories/gram mole of carbon in said methane.

6. Process according to claim 5 wherein the arc intensity, arc gas flow rate, and total feed of reactant material are so correlated to provide at least about 90 and not over 120 kilocalories/gram mole of carbon in said methane.

7. Process according to claim 5 wherein said arc gas is nitrogen.

8. Process according to claim 4 wherein said hydrocarbon is ethane and the arc intensity, arc gas flow rate, and total feed of reactant material are so correlated to provide at least 40 kilocalories/gram mole of carbon in said ethane.

9. Process according to claim 8 wherein said arc gas is nitrogen.

10. Process according to claim 4 wherein said hydrocarbon is propane and the arc intensity, arc gas flow rate, and the total feed of reactant material are so correlated to provide at least 20 kilocalories/gram mole of carbon in said propane.

11. Process according to claim 10 wherein said arc gas is nitrogen.

12. Process for the concurrent production of acetylene and hydrogen cyanide which comprises energizing a high-pressure arc of predetermined arc intensity, flowing at least one arc gas taken from the class consisting of nitrogen, hydrogen and argon at a controllable rate through said high-pressure arc, collimating and stabilizing such hot arc and gas stream by surrounding such stream with a cool surface, discharging the resultant collimated hot arc gas stream at a preselected thermal energy content into a reaction zone, controllably feeding to said reaction zone reactant material taken from the class consisting of hydrocarbons and mixtures of such hydrocarbons with at least one material taken from the class consisting of nitrogen, hydrogen and dissociable nitrogen-containing compounds with the proviso that nitrogen be present either in said arc gas or in the reactant material selected, intimately mixing said hot arc gas stream with said reactant material to produce acetylene and hydrogen cyanide as reaction products, correlating the feed of said total reactant material with the arc intensity and the flow rate of such arc gas to provide at least about 20 and not over about 170 kilocalories/gram mole of carbon in said hydrocarbon, changing the thermal energy content of such hot arc gas stream to change the ratio between acetylene and hydrogen cyanide in said reaction product, and then cooling and quenching said reaction product.

13. Process for the concurrent production of acetylene and hydrogen cyanide which comprises energizing a high-pressure arc of predetermined arc intensity, flowing at least one arc gas taken from the class consisting of nitrogen, hydrogen and argon at a controllable rate through said high-pressure arc, discharging the resultant hot arc gas stream at a pre-selected thermal energy content into a reaction zone, controllably feeding to said reaction zone reactant material taken from the class consisting of hydrocarbons and mixtures of such hydrocarbons with at least one material taken from the class consisting of nitrogen, hydrogen and dissociable nitrogen-containing compounds with the proviso that nitrogen be present either in said arc gas or in the reactant material selected, intimately mixing said hot arc gas stream with said reactant material to produce acetylene and hydrogen cyanide as reaction products, correlating the feed of said total reactant material with the arc intensity and the flow rate of such arc gas to provide at least about 20 and not over 170 kilocalories/gram mole of carbon in said hydrocarbon, and then cooling and quenching said reaction products.

14. Process according to claim 12 wherein said hydrocarbon is methane and the arc intensity, arc gas flow rate, and total feed of reactant material are so correlated to provide at least about 60 kilocalories/gram mole of carbon in said methane.

15. Process according to claim 14 wherein the arc intensity, arc gas flow rate, and the total feed of reactant material is so correlated to provide about 90 and not over 120 kilocalories/gram mole of carbon in said methane.

16. Process according to claim 14 wherein said arc gas is nitrogen.

17. Process according to claim 12 wherein said hydrocarbon is ethane and the arc intensity, arc gas flow rate, and the total feed of reactant material are so correlated to provide at least about 40 kilocalories/gram mole of carbon in said ethane.

18. Process according to claim 12 wherein said hydrocarbon is propane and the arc intensity, the arc gas flow rate, and the total feed of reactant material are so correlated to provide at least about 20 kilocalories/gram mole of carbon in said propane.

References Cited in the file of this patent

UNITED STATES PATENTS

| | | |
|---|---|---|
| 1,369,714 | Southgate | Feb. 22, 1921 |
| 1,495,563 | Rankin | May 27, 1924 |
| 2,632,731 | Von Ediger | Mar. 24, 1953 |
| 2,858,261 | Pevere et al. | Oct. 28, 1958 |
| 2,858,411 | Gage | Oct. 28, 1958 |
| 2,916,534 | Schallus et al. | Dec. 8, 1959 |
| 2,951,143 | Anderson et al. | Aug. 30, 1960 |
| 3,005,762 | Fenn | Oct. 24, 1961 |